May 6, 1969    M. J. WRIGHT    3,443,193
BATTERY CHARGING SYSTEMS FOR USE IN ROAD VEHICLES
Filed Nov. 28, 1966
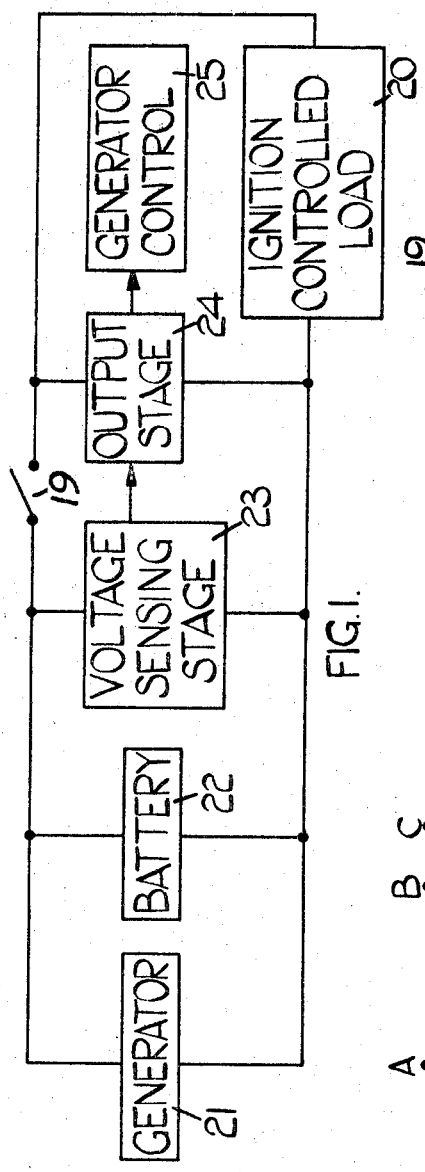
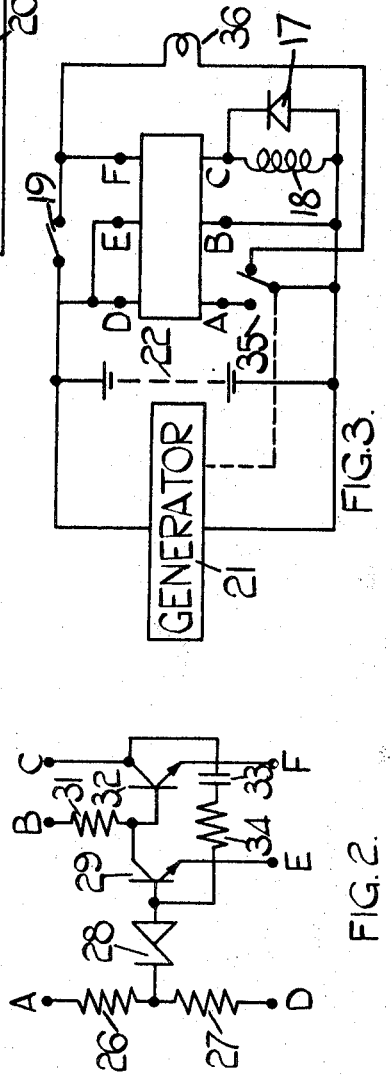
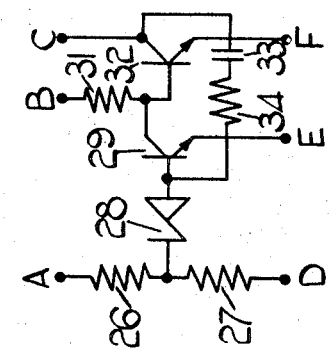

May 6, 1969  M. J. WRIGHT  3,443,193
BATTERY CHARGING SYSTEMS FOR USE IN ROAD VEHICLES
Filed Nov. 28, 1966  Sheet 2 of 2

United States Patent Office 3,443,193
Patented May 6, 1969

3,443,193
BATTERY CHARGING SYSTEMS FOR USE IN ROAD VEHICLES
Maurice James Wright, Birmingham, England, assignor to Joseph Lucas (Industries) Limited, Birmingham, England
Filed Nov. 28, 1966, Ser. No. 597,449
Claims priority, application Great Britain, Dec. 15, 1965, 51,983/65
Int. Cl. H02j 7/10
U.S. Cl. 320—64                               4 Claims

ABSTRACT OF THE DISCLOSURE

This circuit relates to a generator control system the control aspect of which is divided into two parts. The first part is a voltage sensing stage which is connected directly across the battery so as to conduct at all times. The second part is an output drive stage which controls the field. The latter stage is coupled to the battery through the ignition switch so that it will dissipate power only when the ignition switch is closed.

---

This invention relates to battery charging systems for use in road vehicles.

A battery charging system according to the invention includes a generator for charging the battery, a voltage regulator controlling the output of the generator, the voltage regulator having an output circuit including the generator field winding, an output drive stage which controls the output circuit to vary the current flow in the field winding, and a voltage sensing stage which senses the output voltage of the battery and controls the output drive stage to regulate the battery voltage, means permanently coupling the output drive stage to the battery through the ignition switch of the vehicle so that the output drive stage cannot dissipate power except when the ignition switch is closed, and means whereby the voltage sensing stage, but not the output drive stage, is connected directly across the battery (i.e. not through the ignition switch) at least whenever the generator is producing an output.

The connection of the voltage sensing stage directly across the battery, at least when the generator is producing an output, ensures that battery voltage is sensed accurately, and so removes the errors which often arise in known arrangements by virtue of the voltage drop across the ignition switch. The connection of the output drive stage to the battery through the ignition switch at all times ensures that there is no possibility of the ignition switch being by-passed in certain circumstances, as can happen if, for example, the output drive stage is connected directly across the battery once the generator is producing an output.

In the accompanying drawings:

FIGURE 1 is a block diagram illustrating the principle of the invention,

FIGURE 2 is a circuit diagram illustrating a known form of voltage regulator which can be employed in the invention, and FIGURES 3 to 7 respectively are circuit diagrams illustrating five embodiments of the invention utilizing the regulator shown in FIGURE 2.

Figure 4:
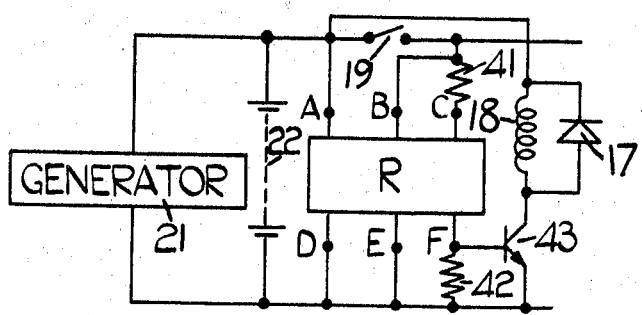

Referring to FIGURE 1, a generator 21, which may be an alternator and associated full-wave rectifier, or a dynamo and associated cut-out, charges a vehicle battery 22 which supplies power through the ignition switch 19 to loads 20 on the vehicle. The output of the generator is controlled by a voltage regulator having a voltage sensing stage 23 which senses the voltage of the battery 22, an output drive stage 24, and an output circuit 25 including the field winding of the generator. The voltage sensing stage 23 is shown connected directly across the battery, and this diagrammatic representation indicates that the stage 23 must sense the battery voltage directly, at least when the generator is producing an output. As will become apparent in considering the specific examples later, the stage 23 need not necessarily be connected directly across the battery 22 at all times. The stage 23 effects some form of control over the output drive stage 24, but the power for the output drive stage 24 must be derived from the battery 22 by way of the ignition switch 19 of the vehicle as shown. Thus, the stage 24 cannot dissipate power when the ignition switch is open, but the stage 23 senses battery voltage accurately at all material times, so that errors resulting from the voltage drop across the ignition switch 19 are eliminated. The stage 24 controls the current flow in the output circuit 25, which cannot conduct in the absence of an input from the stage 24. For this reason, the circuit 25 can be connected across the battery either directly as shown, or through the ignition switch.

There are a large number of voltage regulators which are suitable for incorporation in the invention, but in order to simplify the numerous possible embodiments, there is shown in FIGURE 2 a typical known voltage regulator which can be employed in the invention. Referring to FIGURE 2, the regulator includes terminals A, B which will be connected to the positive battery terminal, a terminal C which will be connected to the positive battery terminal through the field winding of the generator, the field winding being bridged by a diode, and terminals D, E, F which will be connected to the negative battery terminal. Connected in series between the terminals A, D are a pair of resistors 26, 27, a point intermediate which is connected through the cathode-anode path of a Zener diode 28 to the base of an n-p-n transistor 29 having its emitter connected to the terminal E, and its collector connected to the terminal B through a resistor 31. The collector of the transistor 29 is further connected to the base of an n-p-n transistor 32, the emitter of which is connected to the terminal F and the collector of which is connected to the terminal C. The collector of the transistor 32 is further connected through a capacitor 33 and a resistor 34 in series to the base of the transistor 29.

When the battery voltage is below a predetermined value, the Zener diode 28 is non-conductive, and current flows through resistor 31 to turn the transistor 32 on, so that current can flow in the field winding. When the predetermined voltage is reached, the Zener diode 28 breaks down so that the transistor 29 can conduct, and so remove base current from the transistor 32, which tends to turn off. By virtue of the feedback connection through resistor 34 and capacitor 33, the regulator oscillates between one state in which the transistor 32 is fully conductive and the transistor 29 is off, and a second state in which the transistor 29 is fully conductive and the transistor 32 is off. The mark-space ratio is determined by the current flowing through the Zener diode 28, which in turn is dependent upon the battery voltage, and the arrangement is such that the mean current flow in the field winding is controlled to maintain a substantially constant voltage across the battery.

Considering FIGURES 1 and 2 together, it will be apparent that to accord with the invention, terminals A, D must be connected to the battery so as to sense the battery voltage directly, at least when the generator is producing an output. Moreover, in order to ensure that power is not dissipated when the ignition switch is open, the base-emitter circuit of the transistor 32 must derive its power by way of the ignition switch. As previously explained the connection from the terminal C should be either directly to the battery or to the battery by way of the ignition switch.

It must be emphasised that, as previously stated, there are a large number of voltage regulators having a voltage sensing stage, an output drive stage and an output circuit, and which can be employed as indicated in FIGURE 1. However, the invention is not applicable to regulators which do not have the three separate stages mentioned. For example, in a standard electro-mechanical regulator, a coil senses the battery voltage and opens and shuts contacts through which the current flows to the field winding. The contacts are part of the regulator output circuit, but the coils acts both as the voltage sensing stage and the output drive stage, so that the split connections described are not possible which can be employed in the manner indicated in FIGURE 1.

For the sake of convenience, the specific examples to be described will be assumed to employ the regulator shown in FIGURE 2, which will be referred to as the regulator R. However, in some instances an arrangement will be described in which the transistors 29, 32 are p-n-p transistors. In such an arrangement the Zener diode 28 must be reversed, and in this case the terminals D, E, F are connected to the positive battery terminal and the terminals A, B, C are connected to the negative battery terminals. Such an arrangement will be indicated by the reference R1.

FIGURE 3 illustrates one example of the invention utilizing the regulator R1. The generator 21, battery 22 and ignition switch 19 are all given the same reference numerals as in FIGURE 1, and it will be seen that terminals D, E are connected directly to the positive battery terminal, terminal F is connected to the positive battery terminal by way of the ignition switch 19, terminal B is connected directly to the negative battery terminal, and terminal C is connected to the negative battery terminal by way of the generator field winding 18, which is bridged by the usual diode 17. Terminal A, however, is connected to the negative battery terminal by way of a two-position generator-controlled switch 35. The switch 35 normally occupies the position shown in which it couples to the negative battery terminal one side of a warning lamp 36, the other side of which is coupled to the positive battery terminal through the ignition switch 19. The switch 35 moves to its alternative position, in which it completes a circuit from terminal A to the negative battery terminal, when the generator 21 produces an output. The switch 35 can take a variety of forms, and could, for example, in the case where the generator 21 is an alternator be a relay-operated switch with the relay coil connected between a phase point of the alternator and one of the battery terminals.

In operation, when the ignition switch 19 is open, no current flows in any part of the circuit. When the ignition switch 19 is closed, a circuit is completed through the warning lamp 36, which is illuminated. At the same time, current can flow through the ignition switch 19 to the base and emitter of the transistor 32, which conducts so that full field current flows in the winding 18. As soon as the generator produces an output, the position of the switch 35 changes so that the warning lamp 36 is extinguished. At the same time, the potentiometer chain 26, 27 is connected directly across the battery 22, so that it senses battery voltage accurately. It will be appreciated that although the connection of the resistance chain to the battery is through the switch 35, this switch does not introduce the same errors into the system as would be introduced by the ignition switch. The term "directly" is used to mean that the conection is not made through the ignition switch.

In the example shown in FIGURE 4, a regulator R is employed with terminal A connected directly to the positive battery terminal, and terminals D, E connected directly to the negative battery terminal. Terminal B is connected to the positive battery terminal by way of the ignition switch 26, but in this example terminal C does not have the winding 18 in series therewith. Instead, terminal C is connected to the positive battery terminal through a resistor 41 in series with the ignition switch 19, and moreover terminal F is connected to the negative battery terminal through a resistor 42. A further connection from terminal F is made through the base of an n-p-n transistor 43 having its emitter connected to the negative battery terminal and its collector connected to the positive battery terminal through the control 25.

In this example the output circuit mentioned with reference to FIGURE 1 includes the connections from terminals C, F and the transistor 43 together with its associated connections. The operation of the regulator is not quite the same as in FIGURE 3. Instead of the transistor 32, when conductive, supplying current to the winding 18 directly, it serves to turn on the transistor 43 which supplies current to the winding 18. Thus, an extra amplification stage has been added. The reason for this will readily be seen when it is appreciated that the resistance chain 26, 27 has been connected across the battery 22 permanently, so that it dissipates power at all times. The values of the various components are chosen so that this constant dissipation is so small as to be negligible, and the choice of the component values is assisted by the addition of the extra amplification stage. However, the additional amplification stage is not absolutely vital, as will become apparent from a consideration of FIGURE 5.

Figure 5:
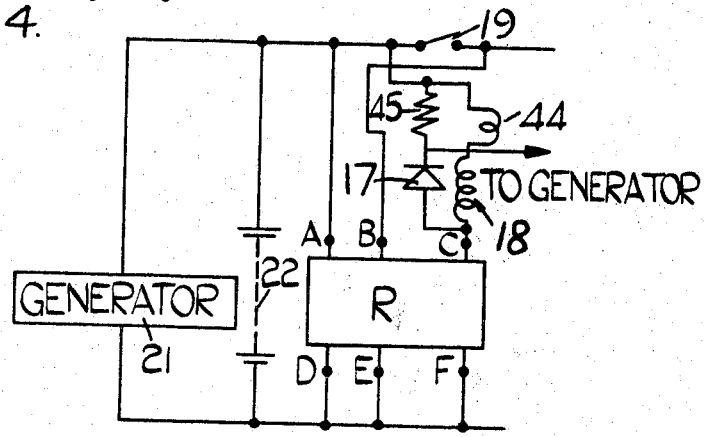

Referring to FIGURE 5, the connection of terminals A, B, D and E of the regulator R are the same as in FIGURE 4, and the terminal F is connected directly to the negative battery terminal. However, the terminal C is connected to the positive battery terminal through the winding 18 and a warning lamp 44 in series, the warning lamp 44 being bridged by a resistor 45. The diode 17 can be connected across the series connection of field winding 18 and warning lamp 44, instead of in the position shown. Moreover, means is provided for ensuring that when the generator is producing an output, the potential at the junction of the lamp 44 and winding 18 rises to the positive battery potential. This could be accomplished by using a generator-controlled switch to couple the junction to the positive battery terminal at the appropriate time, but where the generator is an alternator an alternative arrangement is to provide a separate output from the alternator to the junction through one or more diodes additional to those in the full wave rectifier.

In this example current flows continuously through the resistance chain 26, 27 as in FIGURE 4, and the components are again chosen so that the dissipation is not excessive. When the ignition switch 19 is closed, the transistor 32 in the regulator R is rendered conductive, so that current now flows through the warning lamp 44, the field winding 18 and the transistor 32 in series. The field winding is therefore energised and the warning lamp 44 illuminated. As soon as the generator produces an output, the potential at the junction of the lamp 44 and the field winding rises to approximately that of the positive battery terminal, and so current no longer flows in the warning lamp 44, which becomes extinguished. However, field current still flows in the winding 18, and is controlled by the regulator R. It will be noted that although the current flow to the field winding does not pass through the ignition switch 19, it is still controlled by the ignition switch 19.

The components 44, 45 and the associated connection to the generator can be incorporated between the field winding 18 and the positive battery terminal in FIGURE 4, the operation then being similar to FIGURE 5. In a modification of either example, the lamp 44 is connected to the positive battery terminal through the ignition switch 19.

Figure 6:
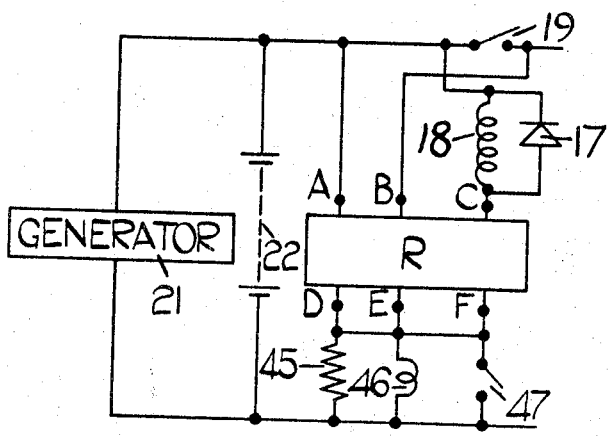

FIGURE 6 illustrates a further example of the invention which is found to be particularly useful. The regulator R is employed with terminal A connected directly to the positive battery terminal, terminal C connected to the positive battery terminal through the winding 18 and terminal B connected to the positive battery terminal through the ignition switch 19. The terminals D, E, F are inter-connected, and are connected to the negative battery terminal through three parallel paths containing respectively a resistor 45, a warning lamp 46 and a switch 47 which is closed by the generator when the generator is producing an output. Either the resistor 45 or the warning lamp 46 could be omitted.

When the ignition switch 19 is open, current can flow through the resistance chain in the regulator R and thence through the resistor 45 and warning lamp 46 in parallel, and so the component values must be chosen such that this current is not excessive, and the warning lamp 46 is not illuminated at this stage. When the ignition switch 19 is closed, the transistor 32 conducts, and the additional current flowing through the warning lamp 46 illuminates it. As soon as the generator produces an output, the switch 47 closes to short-circuit the warning lamp 46 and resistor 45, so that the warning lamp is extinguished and the resistance chain 26, 27 is connected directly across the battery.

In all the examples in which current flows continuously through the resistance chain 26, 27 the actual value of current flow which is satisfactory will depend on the particular application, but as a typical example a current of 10 milliamps or less might well be satisfactory in a 12-volt system. Utilizing transistors having gains of the order of 60, the drain can readily be reduced to this magnitude.

In all the examples so far described, the voltage sensing stage is connected across the battery either permanently or when the generator is producing an output. However, the sensing stage can be connected across the battery when the ignition switch is closed, provided that the connection is made through a control switch which is controlled by the ignition switch, rather than through the ignition switch itself. The control switch is of course chosen so that it will not suffer the same disadvantage as the ignition switch.

Figure 7:
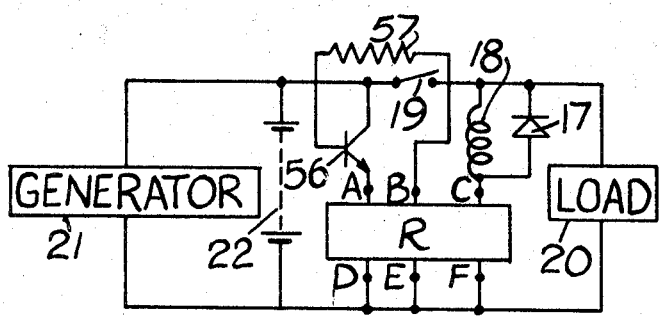

An example of this kind is shown in FIGURE 7, in which the ignition switch 19 is connected in the positive line of the battery 22, and the terminals B, C are both connected to the positive battery terminal by way of the ignition switch. The terminals D, E, F are connected to the negative battery terminal as in FIGURE 7, and the terminal A is connected to the positive battery terminal through the emitter-collector path of a transistor 56, the base of which is connected to the positive battery terminal through a resistor 57 and the ignition switch 19 in series.

When the switch 19 closes, the transistors 56 conducts and connects the resistance chain 26, 27 directly across the battery.

In FIGURE 7 the transistor 56 is in series with the resistors 26, 27 alone, and so it is possible, and in some cases convenient, to connect the transistor 56 between the resistor 26 and the junction of resistor 27 and Zener diode 28. It will be appreciated that the operation is unaltered.

The invention can also be applied to diesel-engined vehicles, and in this respect it should be noted that the term "ignition switch" is used to include the load-controlling switch provided on diesel-engined vehicles. In fact, the load-controlling switch on a diesel-engined vehicle is commonly termed an ignition switch, even though there is no ignition circuit.

Having thus described my invention what I claim as new and desire to secure by Letters Patent is:

1. A battery charging system for a road vehicle, including a generator for charging the battery, a voltage regulator controlling the output of the generator, the voltage regulator having an output circuit including the generator field winding, an output drive stage which controls the output circuit to vary the current flow in the field winding, and a voltage sensing stage connected directly across the battery so as to conduct at all times and which senses the output voltage of the battery and controls the output drive stage to regulate the battery voltage, and means permanently coupling the output drive stage to the battery through the ignition switch of the vehicle so that the output drive stage cannot dissipate power except when the ignition switch is closed.

2. A system as claimed in claim 1 in which the voltage sensing stage is connected to the battery through a warning lamp in parallel with a switch which is closed when the generator is producing an output.

3. A system as claimed in claim 1 in which the voltage sensing stage is connected to the battery through a resistor in parallel with a switch which is closed when the generator is producing an output.

4. A system as claimed in claim 1 in which the output circuit is connected directly across the battery.

References Cited

UNITED STATES PATENTS

| 3,247,443 | 4/1966 | Brayley et al. | 322—88 X |
| 3,373,333 | 3/1968 | Eckard | 320—64 X |

JOHN F. COUCH, *Primary Examiner.*

STANLEY WEINBERG, *Assistant Examiner.*

U.S. Cl. X.R.

322—73